United States Patent
Fujikawa

(10) Patent No.: US 9,982,985 B2
(45) Date of Patent: May 29, 2018

(54) DIGITAL COMPARATOR HAVING A RETRACTABLE ANVIL SUPPORTED AT ONE END OF A U-SHAPED FRAME

(71) Applicant: MITUTOYO CORPORATION, Kawasaki, Kanagawa (JP)

(72) Inventor: Yuji Fujikawa, Kure (JP)

(73) Assignee: MITUTOYO CORPORATION, Kawasaki (JP)

( * ) Notice: Subject to any disclaimer, the term of this patent is extended or adjusted under 35 U.S.C. 154(b) by 353 days.

(21) Appl. No.: 14/700,990

(22) Filed: Apr. 30, 2015

(65) Prior Publication Data

US 2015/0328738 A1    Nov. 19, 2015

(30) Foreign Application Priority Data

May 15, 2014 (JP) ................................. 2014-101488

(51) Int. Cl.
| | |
|---|---|
| *G01B 3/18* | (2006.01) |
| *B23Q 17/20* | (2006.01) |
| *B23Q 35/04* | (2006.01) |
| *G01B 21/00* | (2006.01) |

(52) U.S. Cl.
CPC ............... *G01B 3/18* (2013.01); *B23Q 17/20* (2013.01); *B23Q 35/04* (2013.01); *G01B 21/00* (2013.01)

(58) Field of Classification Search
CPC ........... B23Q 17/20; B23Q 3/04; G01B 21/00
See application file for complete search history.

(56) References Cited

U.S. PATENT DOCUMENTS 4,062,120 A * 12/1977 Lacagnina ............... G01B 3/18
                                                      33/819
2001/0052191 A1* 12/2001 Fujikawa ............... G01B 3/008
                                                      33/813

(Continued)

FOREIGN PATENT DOCUMENTS

| JP | S53-60849 U | 5/1978 |
|---|---|---|
| JP | S58-71101 U | 5/1983 |

(Continued)

OTHER PUBLICATIONS

Mar. 6, 2018 Office Action issued in Japanese Application No. 2014-101488.

*Primary Examiner* — Michael Jung
(74) *Attorney, Agent, or Firm* — Oliff PLC

(57) ABSTRACT

Provided is a comparator including: a substantially U-shaped frame; an anvil supported at one end of the frame in an advanceable and retractable manner; a spindle supported at another end of the frame coaxially with the anvil in an advanceable and retractable manner; a measurement unit that measures the advancement and retraction of the anvil; and a display unit that displays a measurement result of the measurement unit. The measurement unit includes: an anvil contact portion that rotates around a support shaft in accordance with the advancement and retraction of the anvil; an interlocking portion that is formed to have a length greater than the length of the anvil contact portion, is supported so as to be rotatable around the support shaft, and is coupled to the anvil contact portion; and a detection unit that detects a displacement of rotation of the interlocking portion.

6 Claims, 3 Drawing Sheets

(56) References Cited

U.S. PATENT DOCUMENTS

| | | | |
|---|---|---|---|
| 2005/0274034 A1* | 12/2005 | Hayashida | G01B 3/18 33/813 |
| 2006/0162178 A1* | 7/2006 | Freidin | G01B 3/18 33/784 |
| 2015/0059480 A1* | 3/2015 | Dockrey | G01B 21/04 73/649 |

FOREIGN PATENT DOCUMENTS

| | | |
|---|---|---|
| JP | S58-135901 A | 8/1983 |
| JP | 2002-005602 A | 1/2002 |
| JP | 2002-131004 A | 5/2002 |
| JP | 2014-74643 A | 4/2014 |

* cited by examiner

DIGITAL COMPARATOR HAVING A RETRACTABLE ANVIL SUPPORTED AT ONE END OF A U-SHAPED FRAME

INCORPORATION BY REFERENCE

This application is based upon and claims the benefit of priority from Japanese patent application No. 2014-101488, filed on May 15, 2014, the disclosure of which is incorporated herein in its entirety by reference.

BACKGROUND OF THE INVENTION

1. Field of the Invention

The present invention relates to a digital comparator.

2. Description of Related Art

A comparator is known as a measuring instrument that measures a dimensional difference of a workpiece relative to a master workpiece. For example, a comparator disclosed in Japanese Unexamined Patent Application Publication No. 2002-131004 includes a frame, a spindle and an anvil, which are provided on the frame, biasing means, separation means, an indicator, and indicator driving means.

The spindle and the anvil are supported by the frame so as to be advanceable and retractable in the axial direction thereof to move toward and away from each other. The biasing means is provided on the frame and biases the anvil toward the spindle. The separation means retracts the anvil relative to the spindle against the biasing means. The indicator driving means is provided on the frame and transmits the movement of the anvil to the indicator.

In order to measure a dimensional difference of a workpiece relative to a master workpiece in the structure described above, the anvil is first retracted away from the spindle by the separation means. Then, after the master workpiece is inserted between the anvil and the spindle, the separation operation of the separation means is released to advance the anvil toward the spindle by the biasing means.

As a result, the master workpiece is held between the anvil and the spindle. At this time, the spindle is moved in the axial direction thereof, or the dial of the indicator is rotated, to thereby conduct zero adjustment of a pointer. Subsequently, after the anvil is retracted by the separation means to detach the master workpiece from the comparator, a workpiece is held and measured between the anvil and the spindle in the same operation. Accordingly, the value of the indicator can be measured as a dimensional difference of the workpiece relative to the master workpiece.

SUMMARY OF THE INVENTION

In recent years, there has been a demand for digitization of a comparator for the purpose of, for example, preventing man-made errors in reading values in the field of measurement, eliminating errors in reading values, and directly loading data on measurement results into a measurement system such as a PC.

In order to digitize a comparator, it is necessary to use a battery-powered comparator, which can be easily carried by hands and easily make a measurement, and to incorporate a digital display (instead of using an external digital display). It is also necessary to digitize a value less than the value corresponding to one division (1 µm) of a scale, as in the case of reading a scale of a mechanical indicator.

However, in order to digitally display a dimensional difference of less than the value corresponding to one division (1 µm) of the scale, a sensor having a resolution less than 1 µm is required. However, since there is no battery-powered sensor with a resolution less than 1 µm, the digitization of a comparator has not been achieved.

The present invention has been made to solve the above-mentioned problem, and an object of the present invention is to provide a digital comparator.

An exemplary aspect of the present invention is a comparator including: a substantially U-shaped frame; an anvil supported at one end of the frame in an advanceable and retractable manner; a spindle supported at another end of the frame coaxially with the anvil in an advanceable and retractable manner; a measurement unit that measures the advancement and retraction of the anvil; and a display unit that displays a measurement result of the measurement unit. The measurement unit includes: an anvil contact portion that rotates around a support shaft in accordance with the advancement and retraction of the anvil; an interlocking portion that is formed to have a length greater than the length of the anvil contact portion, is supported so as to be rotatable around the support shaft, and is coupled to the anvil contact portion; and a detection unit that detects a displacement of rotation of the interlocking portion. With this structure, a displacement of the spindle can be magnified by the interlocking portion and detected by the detection unit.

According to the present invention, it is possible to provide a digital comparator.

The above and other objects, features and advantages of the present invention will become more fully understood from the detailed description given hereinbelow and the accompanying drawings which are given by way of illustration only, and thus are not to be considered as limiting the present invention.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
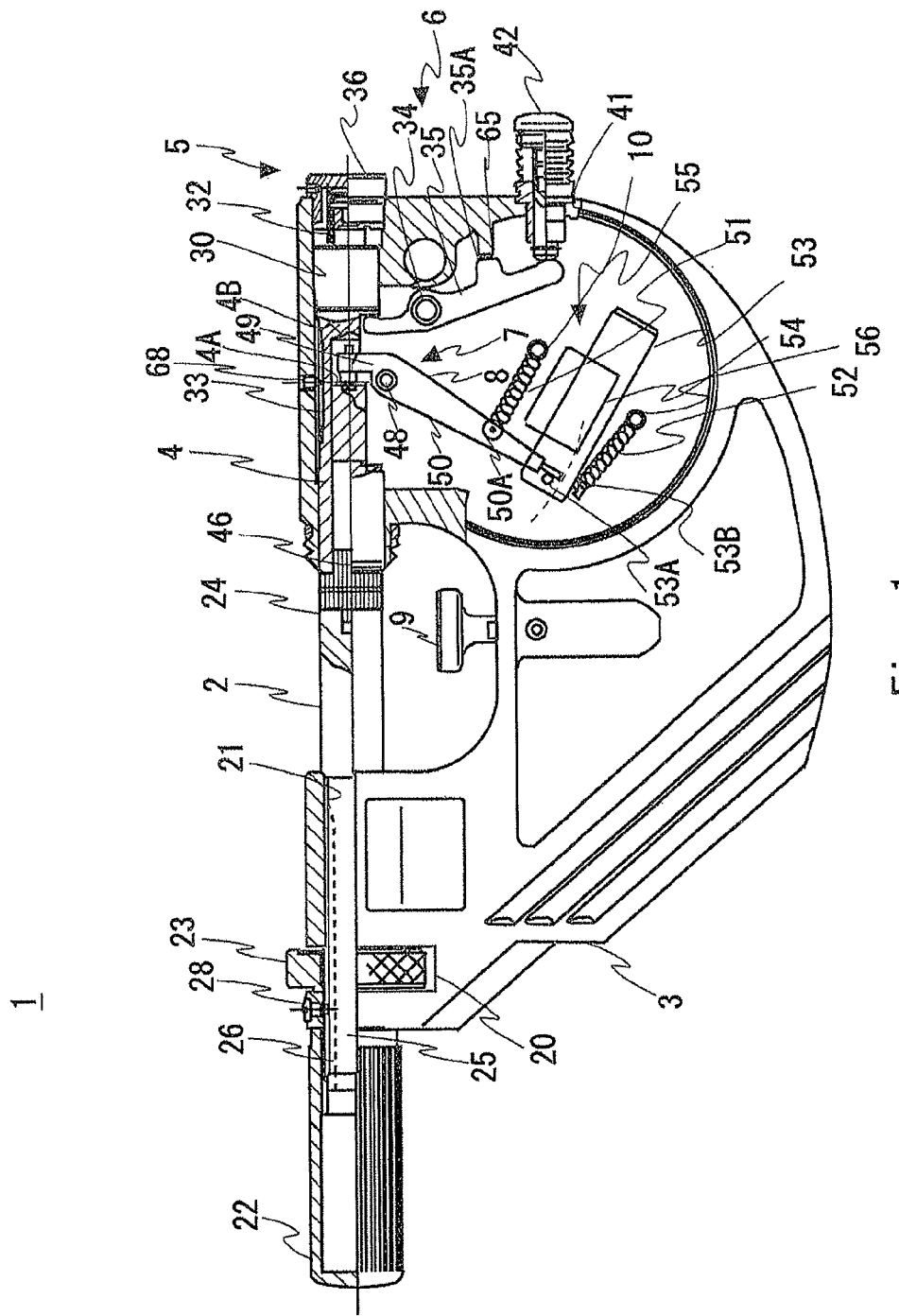
FIG. 1 is a diagram showing a part of a side surface and a cross-section of a comparator according to an exemplary embodiment of the present invention.
Figure 2:
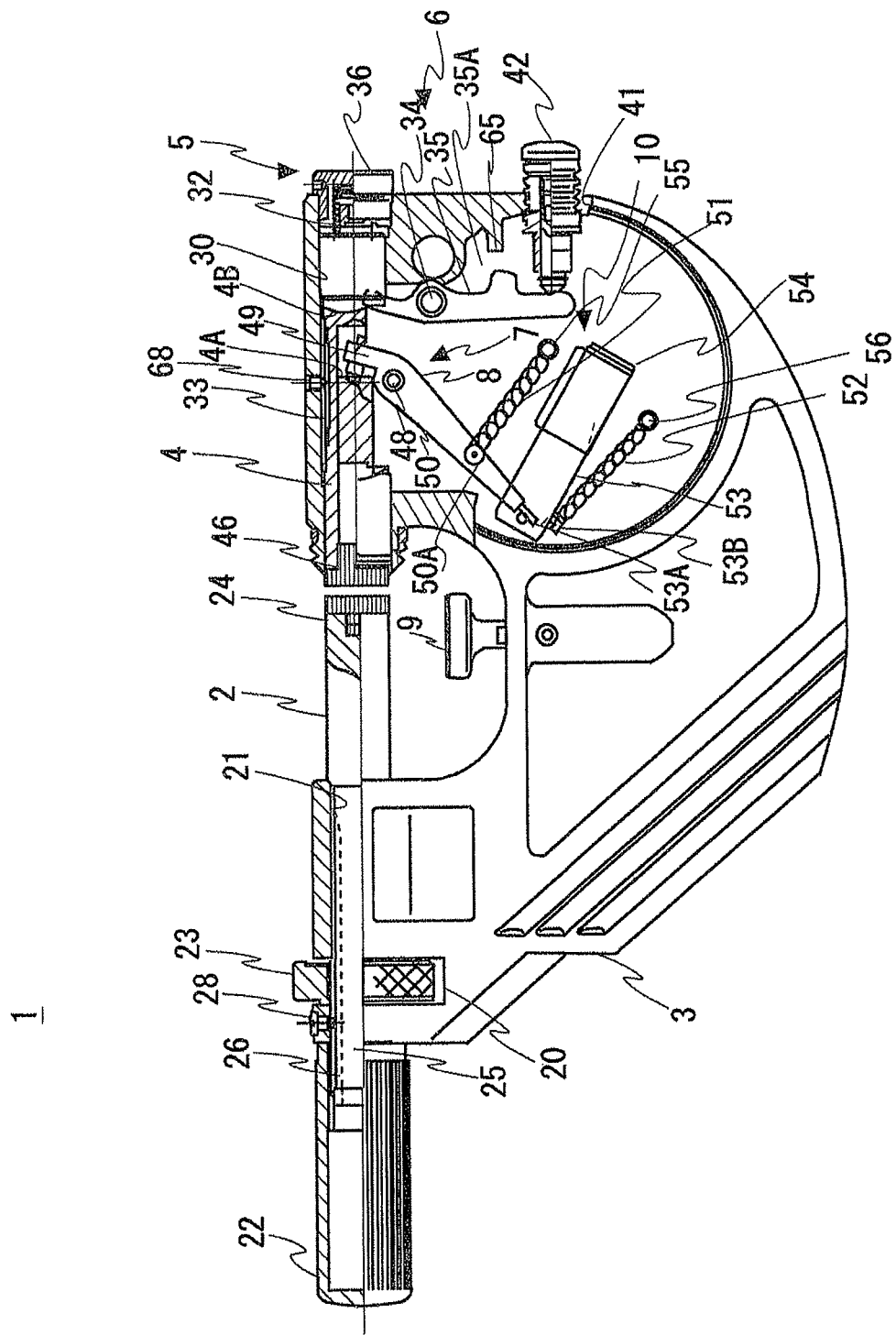
FIG. 2 is a diagram showing a part of the side surface and the cross-section of the comparator according to the exemplary embodiment of the present invention.

Exemplary embodiments of the present invention will be described below with reference to the drawings. FIGS. 1 and 2 are partial sectional views of a comparator 1 in a side view.

The comparator 1 includes a spindle 2, a frame 3, an anvil 4, an biasing force unit 5, a separation unit 6, a measurement unit 7, a support base 9, a detection unit 10, and a display unit (not shown). The support base 9 is provided on the frame 3 and supports a measured object.

The frame 3 has a U-shape. The spindle 2 is provided at one end of the frame 3, and the anvil 4 is provided at another end of the frame 3.

At one end of the frame 3, an insertion hole 21 and a recess 20 are formed. The insertion hole 21 is located coaxially with the anvil 4. The recess 20 is formed in the middle of the insertion hole 21 and is orthogonal to the insertion hole 21. In the insertion hole 21, the spindle 2 is inserted in the axial direction thereof in an advanceable and retractable manner. In the recess 20, a spindle advancing/retracting ring 23 that advances and retracts the spindle 2 is rotatably provided.

The spindle 2 is supported at one end of the frame 3 and advances and retracts in the axial direction of the spindle 2. The spindle 2 includes a hard contactor 24 which is formed at an inner end (an end on the anvil 4 side). A male screw 25 is engraved on the outer periphery of the spindle 2 from a substantial center thereof to an outer end thereof. The male screw 25 has a key way 26 formed along the axial direction of the spindle 2. The key way 26 engages with a tip end of a bolt 28 which is screwed into the frame 3. The spindle advancing/retracting ring 23 disposed in the recess 20 is screwed into an intermediate portion of the male screw 25, and a clamp cap 22 is screwed into a portion on the outer end side of the spindle 2.

The spindle advancing/retracting ring 23 is rotatably provided in a state where the movement of the spindle 2 in the axial direction thereof is regulated in the recess 20. Accordingly, since the rotation of the spindle 2 is regulated by the bolt 28 and the key way 26, the spindle 2 is allowed to advance and retract in the axial direction thereof by the rotation of the spindle advancing/retracting ring 23.

The clamp cap 22 has a cylindrical shape which is longer in the axial direction of the spindle 2 than the linear dimension of the spindle 2 in which the advancement and retraction of the spindle 2 can be adjusted. The clamp cap 22 is screwed into the outer end of the spindle 2. Accordingly, no matter where the spindle 2 is located, the spindle 2 is clamped to the frame 3 by rotating the clamp cap 22 to bring the inner end of the clamp cap 22 into contact with the frame 3.

The anvil 4 is supported at another end of the frame 3 coaxially with the spindle 2, and advances and retracts in the axial direction thereof to thereby move toward and away from the spindle 2. As shown in FIG. 2, the anvil 4 of the comparator 1 retracts from the spindle 2.

An insertion hole 30 is formed at another end of the frame 3 (at an end opposite to the spindle 2) coaxially with the spindle 2. The anvil 4 is housed in the insertion hole 30 in such a manner that the anvil 4 can advance and retract in the axial direction of the spindle 2.

The anvil 4 includes a hard contactor 46 at an inner end thereof (an end on the spindle 2 side). At a substantial center of the anvil 4, a contact surface 4A and a contact surface 4B, which are perpendicular to the axial direction of the anvil 4, are notched, and a key way 33 is formed along the axial direction of the anvil 4.

The contact surface 4A is formed in the direction opposite to the inner end face of the anvil 4, and the contact surface 4B is formed so as to be opposed to the contact surface 4A. The key way 30 engages with a tip end of a pin 68 which is screwed into the frame 3, thereby regulating the rotation of the anvil 4.

The biasing force unit 5 is composed of a compression spring 32 and an adjustment cap 36. The compression spring 32 is screwed into the outer end of the insertion hole 30 and serves as a biasing unit housed in the insertion hole 30 at the outer end of the anvil 4. The adjustment cap 36 receives the biasing force of the compression spring 32.

The separation unit 6 includes an operation knob 42 and an anvil moving member 35. The operation knob 42 projects toward the outside from the inside of the frame 3, and can advance and retract in the axial direction thereof. The anvil moving member 35 is provided between the operation knob 42 and the anvil 4, and causes the anvil 4 to retract from the spindle 2 in conjunction with the operation of the operation knob 42. The operation knob 42 is supported on the frame 3 through an insertion tube 41.

The anvil moving member 35 is rotatably supported on the frame 3 through a central shaft 34. One end of the anvil moving member 35 is bought into contact with the contact surface 4B, and the other end of the anvil moving member 35 is brought into contact with the inner end of the operation knob 42. A protruding portion 35A is formed between the central shaft 34 and the other end of the anvil moving member 35.

The measurement unit 7 includes a rotation member 8 serving as a magnification mechanism supported so as to be rotatable around a pin 48. The rotation member 8 includes an anvil contact portion 49 and an interlocking portion 50. The anvil contact portion 49 is provided at a location closer to the anvil 4 than the pin 48. The interlocking portion 50 is provided at a location farther from the anvil 4 than the pin 48.

The interlocking portion 50 includes a pin 50A that is formed between the pin 48 and an end of the interlocking portion 50. A spring 51 is disposed between the pin 50A and the pin 55 that is fixed to the frame 3. When the anvil 4 is in contact with the spindle 2, the spring 5 is compressed. As shown in FIG. 2, even when the anvil 4 retracts from the spindle 2, the spring 51 biases the rotation member 8 so as to press the rotation member 8.

The detection unit 10 includes a scale 53 and a sensor 54. The sensor 54 detects a movement of the scale 53.

The scale 53 includes a pin 53A and a projection 53B. The projection 53B is provided on a side surface of the scale 53. The projection 53B and a pin 56 provided on the frame 3 are connected to each other with a spring 52. In the example shown in FIGS. 1 and 2, the spring 52 is provided in an extended state and thus constantly pulls the scale 53. The pin 53A is provided perpendicularly to the surface of the scale 53 and is in contact with a tip end of the interlocking portion 50. In this case, since the interlocking portion 50 is biased by the spring 51 and the scale 53 is biased by the spring 52, the scale 53 moves in accordance with the rotation of the interlocking portion 50.

In this case, one end of the rotation member 8, i.e., an end of the anvil contact portion 49, is brought into contact with the contact surface 4A, and fluctuates in accordance with the advancement and retraction of the spindle 2. The rotation member 8 is provided in such a manner that the length of the interlocking portion 50 (the length from the center of the pin 48 to the interlocking portion 50) is longer than the length of the anvil contact portion 49 (the length from the center of the pin 48 to an end of the anvil contact portion 49). This structure makes it possible to magnify the fluctuation of the anvil contact portion 49 to the fluctuation of the interlocking portion 50.

Assume that, for example, the length of the anvil contact portion 49 is 6.5 mm and the length of the interlocking portion 50 is 32.5 mm. Since the ratio between the length of the anvil contact portion 49 and the length of the interlocking portion 50 is 1:5, the displacement of the rotation of an end of the interlocking portion 50 is magnified to five times the displacement of the rotation of an end of the anvil contact portion 49.

Accordingly, the advancement and retraction of the anvil 4, which has not been detected by the sensor 54 of the related art, can be magnified as the rotation of the interlocking portion 50 by the rotation of the anvil contact portion 49, so that the advancement and retraction of the anvil 4 can be detected by the sensor 54. Therefore, the digitization of the comparator 1 can be achieved.

It is only necessary that the directions of the biasing forces of the springs 51 and 52 be opposite to each other and the springs 51 and 52 cause the interlocking portion 50 and the pin 53A of the scale 53 to be constantly in contact with each other. In this case, the scale 53 is moved in conjunction with the rotation member 8. However, the scale 53 may be fixed and structured so that the sensor 54 can move in conjunction with the rotation member 8.

For example, in the above exemplary embodiment, the magnification mechanism including the rotary member has been described. However, the structure of the magnification mechanism is not limited to this. For example, the same effects can be obtained also when a magnification unit incorporating a plurality of gears is used.

Figure 3:
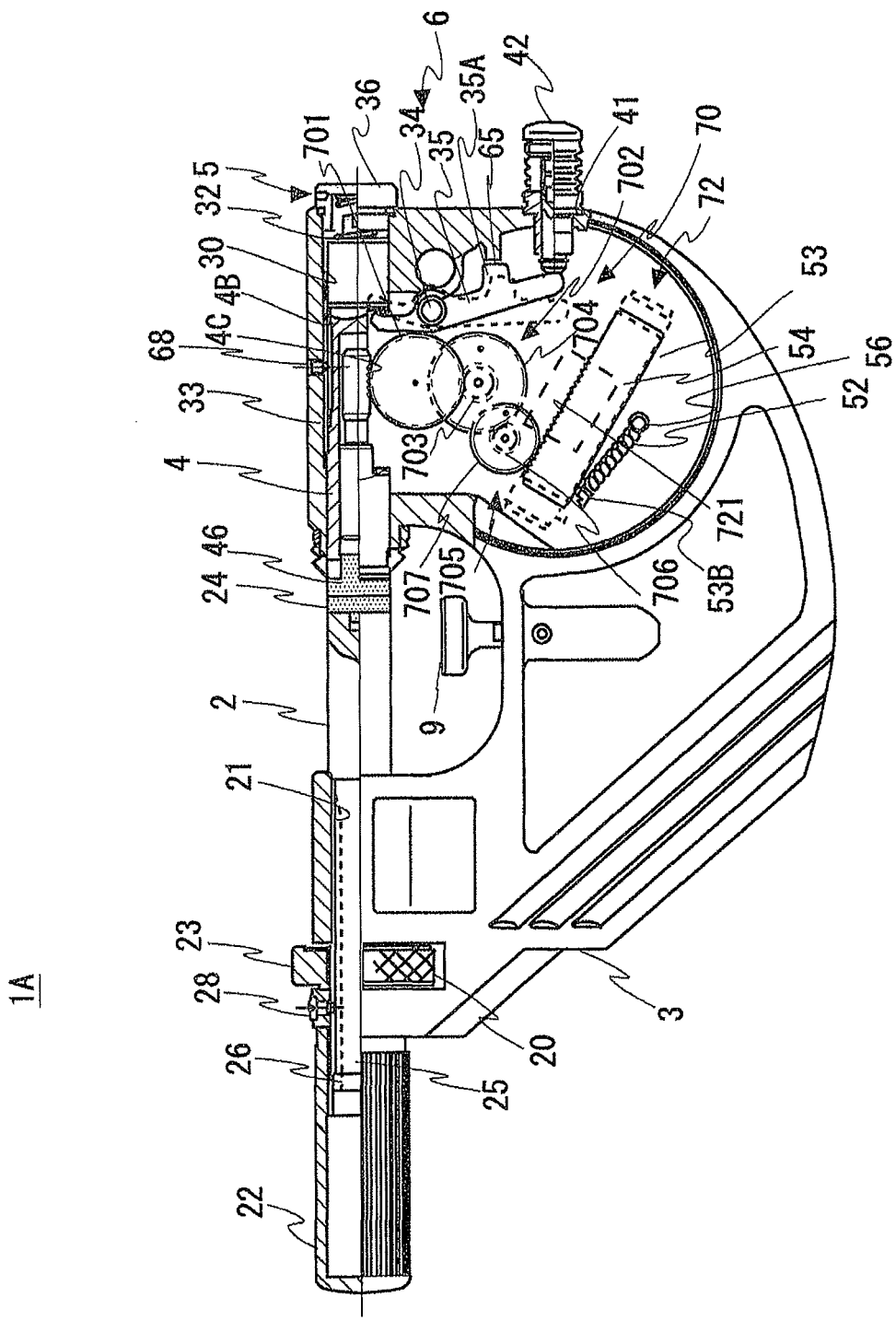
FIG. 3 is a diagram showing a part of a side surface and a cross-section of a comparator according to another exemplary embodiment of the present invention.

FIG. 3 is a diagram showing a cross-section of a comparator 1A according to another exemplary embodiment of the present invention. Structures of a magnification mechanism 70 and a detection unit 72 in the comparator 1A are different from those of the comparator 1.

The magnification mechanism 70 magnifies a displacement of the anvil 4 and transmits the magnified displacement to the detection unit 72. The detection unit 72 detects the displacement transmitted from the magnification mechanism 70.

The anvil 4 includes a rack 4C which is formed on a side surface thereof at a side opposite to the end at which the contactor 46 is provided.

The magnification mechanism 70 includes a first gear 701 and a first combination gear 702, and a second combination gear 705. The first combination gear 702 and the second combination gear 705 are used to magnify the rotation of the first gear 701. The first gear 701 is a pinion that engages with the rack 4C. Accordingly, the first gear 701 rotates in accordance with the displacement of the anvil 4.

The first combination gear 702 is composed of a second gear 703 and a third gear 704. The second gear 703 rotates in conjunction with the first gear 701. The third gear 704 is formed coaxially with the second gear 703 and is coupled to the second gear 703. The radius of the third gear 704 is greater than that of the second gear 703. With this structure, the displacement of the anvil 4 is magnified between the second gear 703 and the third gear 704.

The second combination gear 705 is composed of a fourth gear 706 and a fifth gear 707. The fourth gear 706 rotates in conjunction with the third gear 704. The fifth gear 707 is formed coaxially with the fourth gear 706 and is coupled to the fourth gear 706. The radius of the fifth gear 707 is greater than that of the fourth gear 706. With this structure, the displacement of the anvil 4 is magnified between the fourth gear 706 and the fifth gear 707.

Specifically, the magnification mechanism 70 transmits the displacement of the anvil 4 to the detection unit 72 through the first gear 701, the first combination gear 702, and the second combination gear 705.

The detection unit 72 includes a rack 721, the scale 53, and the sensor 54. The rack 721 is provided in an advanceable and retractable manner, and engages with the fifth gear. The scale 53 is coupled to the rack 721.

In the comparator 1A, the magnification mechanism including the first gear 701 and the first and second combination gears 702 and 705 that magnify the rotation of the first gear 701 is used to magnify the displacement of the anvil 4, and the displacement is detected by the detection unit 72, so that a more precise measurement can be achieved.

Note that the comparators 1 and 1A may be provided with a connection port as an external connection unit that is connectable to a measurement device such as an external PC. Through the connection port, measured data can be output to the outside of the comparators, which facilitates management of data.

The present invention is not limited to the above exemplary embodiments, and can be modified in various manners without departing from the scope of the invention. The above exemplary embodiments illustrate the magnification mechanism using the anvil contact portion and the interlocking portion and the magnification mechanism using the combination gears. However, the magnification mechanism is not limited to these examples.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A comparator comprising:
   a substantially U-shaped frame;
   an anvil supported at one end of the U-shaped frame in an advanceable and retractable manner;
   a spindle supported at another end of the U-shaped frame coaxially with the anvil in an advanceable and retractable manner;
   a measurement unit that measures the advancement and retraction of the anvil; and
   a display that displays a measurement result of the measurement unit, wherein the measurement unit comprises:
      a magnification mechanism that (i) includes an interlocking portion of the displaced in conjunction with the advancement and retraction of the anvil, (ii) magnifies an amount of the advancement and retraction of the anvil, and (iii) transmits the magnified amount of the advancement and retraction of the anvil; and
      a detection unit, comprises of a scale and a sensor, that detects the magnified amount of the advancement and retraction of the anvil transmitted by the magnification mechanism by sensing movement of the scale with the sensor, wherein the movement of the scale sensed by the sensor is linear in direction.

2. The comparator according to claim 1, wherein the magnification mechanism comprises:
   an anvil contact portion that rotates around a support shaft in accordance with the advancement and retraction of the anvil; and
   the interlocking portion that is formed to have a length greater than the length of the anvil contact portion, is supported so as to be rotatable around the support shaft, and is coupled to the anvil contact portion.

3. The comparator according to claim 1, wherein a result of the measurement by the measurement unit is digitally displayed.

4. The comparator according to claim 1, further comprising an external connector that connects to an external measurement system.

5. The comparator according to claim 1, wherein:
   the advancement and retraction of the anvil measured by the measurement unit is linear in direction.

6. A comparator comprising:
a substantially U-shaped frame;
an anvil supported at one end of the U-shaped frame in an advanceable and retractable manner;
a spindle supported at another end of the U-shaped frame coaxially with the anvil in an advanceable and retractable manner;
a measurement unit that measures the advancement and retraction of the anvil; and
a display that displays a measurement result of the measurement unit, wherein:
the measurement unit comprises:
   a magnification mechanism that magnifies an amount of the advancement and retraction of the anvil and transmits the magnified amount of the advancement and retraction of the anvil; and
   a detection unit, comprises of a scale and a sensor, that detects the magnified amount of the advancement and retraction of the anvil transmitted by the magnification mechanism by sensing movement of the scale with the sensor,
the magnification mechanism comprises:
   a first gear that rotates in accordance with the advancement and retraction of the anvil; and
   a first combination gear and a second combination gear that magnify a displacement of the anvil,
the first combination gear comprises:
   a second gear that rotates in conjunction with the first gear; and
   a third gear that is formed coaxially with the second gear, is coupled to the second gear, and has a diameter greater than that of the second gear,
the second combination gear comprises:
   a fourth gear that rotates in conjunction with the third gear; and
   a fifth gear that is formed coaxially with the fourth gear, is coupled to the fourth gear, and has a diameter greater than that of the fourth gear, and
the detection unit detects a displacement of rotation of the fifth gear, wherein the movement of the scale sensed by the sensor is linear in direction.

* * * * *